United States Patent [19]

Joubert

[11] 4,289,643

[45] Sep. 15, 1981

[54] STABILIZATION OF ANHYDROUS SODIUM METASILICATE

[75] Inventor: Daniel Joubert, Trevoux, France

[73] Assignee: Rhone-Poulenc Industries, Paris, France

[21] Appl. No.: 71,028

[22] Filed: Aug. 30, 1979

Related U.S. Application Data

[63] Continuation of Ser. No. 877,882, Feb. 15, 1978, abandoned.

[30] Foreign Application Priority Data

Feb. 16, 1977 [FR] France ............................ 77 04380

[51] Int. Cl.$^3$ ............................................. C11D 7/54
[52] U.S. Cl. ........................... 252/103; 252/135; 252/174.14; 252/174.25; 252/194
[58] Field of Search ............... 252/103, 135, 174.14, 252/174.25, 194

[56] References Cited

U.S. PATENT DOCUMENTS

| | | | |
|---|---|---|---|
| 3,491,028 | 1/1970 | Crotty et al. | 252/103 |
| 3,996,399 | 12/1976 | Vrisakis | 252/135 X |
| 4,001,038 | 1/1977 | Justice et al. | 252/103 |
| 4,031,024 | 6/1977 | Vrisakis | 252/135 |
| 4,075,116 | 2/1978 | Mesaros | 252/99 |

*Primary Examiner*—Mayer Weinblatt
*Attorney, Agent, or Firm*—Burns, Doane, Swecker & Mathis

[57] ABSTRACT

Anhydrous sodium metasilicate is stabilized against attrition or "dusting" in detergent and other use, by formulating same with such amount of an additive, e.g., a hydrate, that will transfer water content to the anhydrous metasilicate, at a temperature less than the fusion temperature of sodium metasilicate pentahydrate and as will convert from about 1% to 20% by weight of said anhydrous metasilicate into its pentahydrate form.

12 Claims, No Drawings

STABILIZATION OF ANHYDROUS SODIUM METASILICATE

This is a continuation of application Ser. No. 877,882, filed Feb. 15, 1978, now abandoned.

BACKGROUND OF THE INVENTION

1. Field of the Invention

The present invention relates to the stabilization of anhydrous sodium metasilicate and, more especially, to the stabilization of anhydrous sodium metasilicate by formulating same with certain water evolving additives as will release molecular water thereto; thus converting a minor proportion of the anhydrous metasilicate into its pentahydrate form.

2. Description of the Prior Art

Sodium metasilicate is a commercially valuable salt highly useful in the manufacture of soap and various detergent compositions, imparting thereto the required alkalinity while at the same time being less caustic than the otherwise comparable alkaline salts. In particular, in spite of its alkalinity sodium metasilicate is far less corrosive to glass and such light metals as aluminum.

Furthermore, this salt is a highly advantageous emulsifying agent for detergent compositions and too is characterized by the ability to firmly resist redeposition.

Also, it is widely used in detergent compositions intended for household washing, e.g., for the washing of kitchen utensils and glass- and tableware. Such detergent compositions typically contain nonionic surface active agents which reduce the surface tension of the wash water, thus reinforcing the detergent and more readily emulsifying any fats. As examples of the surface active agents typically comprising the known detergents, there are noted those surfactants resulting from the condensation of ethylene oxide and a polypropylene glycol, or of ethylene oxide and alkyl phenols.

Unfortunately, however, those compositions formulated from an admixture of the aforementioned ingredients and of anhydrous sodium metasilicate are not stable. Specifically, such compositions are subject to coloration after but a limited period of storage time, and, not uncommonly, the evolution of a perfume-like odor is detected, especially when the compositions comprise aldehyde bases.

It too will be appreciated that the problematical "inversion" temperature of such compositions varies as a function of time. The "inversion" temperature is defined as that temperature, above which an aqueous solution of said composition becomes heterogeneous by phase separation into two liquid phases; this separation effects deleterious variation in the hydrophilic/lipophilic balance of the surface active agent.

Another problem ascribable to anhydrous sodium metasilicate is that it causes respiratory problems in users thereof. These respiratory problems (nasal irritation, sneezing, etc.) are due to the inhalation of the very fine metasilicate powder or dust which results from the wear or attrition of the larger particles sizes during the various mechanical manipulations encountered on use of the product. The term "dusting" is used herein to describe this phenomenon.

It too has already been proposed to stabilize this metasilicate by treating it with certain gluconic derivatives, as described in U.S. Pat. No. 4,031,024, e.g., by treatment with gluconic acid or with the water soluble sodium salts thereof, or with certain derivatives of phosphorus, as described in U.S. Pat. No. 3,996,399, e.g., by treatment with monosodium phosphate. From a practical point of view, however, such treatments require the use of a liquid medium which necessitates pulverization. Treatment with a liquid is required because the objective is to reduce attrition and "dusting".

SUMMARY OF THE INVENTION

It has now unexpectedly been discovered, and this is a summary object of the present invention, that by compounding the metasilicate with a solid, quite simply and without the need for pulverization, stabilization at least as good as that attained via liquid treatment is obtained.

Briefly, according to the invention anhydrous sodium metasilicate is stabilized by formulating same with at least one additive capable of releasing water molecules at a temperature below the fusion temperature of pentahydrated sodium metasilicate [72.2° C.], so as to convert 1 to 20% by weight, preferably 2 to 10% by weight, of the anhydrous metasilicate into the pentahydrated metasilicate.

By "anhydrous sodium metasilicate" as used herein, there is denoted a sodium metasilicate having the formula $Na_2O \cdot SiO_2$ and containing a maximum of 10% water. Hereafter, for the sake of convenience the expression sodium metasilicate shall be used as descriptive of the anhydrous sodium metasilicate.

DETAILED DESCRIPTION OF THE INVENTION

According to the invention, it has now surprisingly been found that the anhydrous metasilicate particles converted into pentahydrated metasilicate particles are those which correspond to the fines responsible for, and giving rise to, the aforesaid phenomenon of "dusting". Thus, the desirable properties of the sodium metasilicate, which salt is maintained essentially anhydrous, are preserved. In addition, the inconvenience of any pulverization parameter, which in any event does not act preferentially on the finer of the particles, is avoided.

The additives formulated with the metasilicate according to the invention simply comprise at least one hydrate, or a hydrated composition, or admixtures thereof. Exemplary of the hydrates are the tetraborates such as the decahydrate of sodium tetraborate, $Na_2B_4O_7.10H_2O$; $Na_2CO_3.7H_2O$; also the hepta-and dodecahydrates of disodium phosphate and the hexahydrate of trimetaphosphate, i.e., $Na_2HPO_4.7H_2O$, $Na_2HPO_4.12H_2O$ and $(NaPO_3)_3.6H_2O$; and $Na_2SO_4.10H_2O$.

Thus, the aforenoted compounds, their water loss at certain temperatures being shown in Table I, afford results consistent with the objects of the invention, whereas those compounds listed in Table II do not yield results consistent with the invention, nor does treating the anhydrous metasilicate with the 9 $H_2O$ hydrate of sodium metasilicate, as disclosed in German Pat. No. 643,584. The water losses are those set forth in Handbook of Chemistry and Physics, 37th Edition, 1976–1977, published by CRC Press.

TABLE I

| Hydrate | Water loss at X° C. |
|---|---|
| $Na_2B_4O_7 . 10 H_2O$ | 8 $H_2O$ at 60° C. |
| $Na_2CO_3 . 7 H_2O$ | $H_2O$ at 32° C. |
| $Na_2HPO_4 . 7 H_2O$ | 5 $H_2O$ at 48.1° C. |
| $Na_2HPO_4 . 12 H_2O$ | 5 $H_2O$ at 35.1° C. |
| $(NaPO_3)_3 . 6 H_2O$ | 6 $H_2O$ at 50° C. |

TABLE I-continued

| Hydrate | Water loss at X° C. |
| --- | --- |
| $Na_2SO_4 \cdot 10 H_2O$ | $10 H_2O$ at 30° C. |

TABLE II

| Hydrate | Water loss at X° C. |
| --- | --- |
| $Na_5P_3O_{10} \cdot 6 H_2O$ | |
| $Na_2B_4O_7 \cdot 5 H_2O$ | $H_2O$ at 120° C. |
| $Na_3C_6H_5O_5 \cdot 2 H_2O$ | $2 H_2O$ at 150° C. |
| $Na_3PO_4 \cdot 12 H_2O$ | $12 H_2O$ at 100° C. |
| $Na_4P_2O_7 \cdot 10 H_2O$ | $H_2O$ at 94° C. |
| $Na_2C_4H_4O_6 \cdot 2 H_2O$ | $2 H_2O$ at 150° C. |

The present invention, however, is not strictly limited to either the hydrates or hydrated compounds, but also envisages those additives comprising hydrated salts and additives comprising pulverized or powdered compounds having water sorbed therein in amounts greater than that amount necessary for equilibrium with said pulverized compounds, so as to be able to transfer their water content to the metasilicate. Such an additive may comprise a soluble caustic compound, but it may also comprise an insoluble, finely divided derivative thereof capable of absorbing at least its own weight of water. Only a very small amount of such an additive need be included, and exemplary thereof are silica, such as precipitated silica, or an insoluble derivative of silica.

The metasilicates treated in accordance with the present invention may then be formulated into suitable detergent compositions; preferably the subject, modified metasilicates are first introduced and the other ingredients added subsequently. Lastly added is a source of chlorine, should the detergent composition require same for its intended use.

Preferably, the compositions according to the invention contain 0.1 to 5% by weight of the water releasing and transferring additive based upon the weight of the sodium metasilicate.

A representative composition according to the invention comprises the following ingredients, preferably admixed in the same order:

[i] 20 to 60% anhydrous sodium metasilicate having a particle size with a medium diameter equal to 0.8 mm;
[ii] 0.1 to 5% of the additive according to the invention; 30 to 70% of sodium triphosphate
[iii] 0.1 to 3% of an anionic surface active agent;
[iv] 10 to 30% sodium carbonate; and,
[v] 0.1 to 3% of a compound capable of releasing chlorine, such as potassium or sodium diisochlorocyanurate. Such a formulation does not result in "dusting". In addition, the "inversion" temperature does not appreciatively vary when measured between the point of formulation and after one month of storage.

In order to further illustrate the present invention and the advantages thereof, the following specific examples are given, it being understood that the same are intended only as illustrative and in no wise limitative.

In the examples which follow, "dusting" was determined by measuring the amount of fine particles which remained adhered to the walls of a PVC receptacle through electrostatic attraction or deposition. Into a 250 cm³, cylindrical PVC flask, 50 g of the product to be tested were introduced. The material was agitated for 5 minutes at moderate speed (approximately 40 rpm). The contents of the flask were then emptied and the flask washed with 200 cm³ distilled water, and the water titrated with 10 N hydrochloric acid in the presence of phenolphthalein; dusting is expressed in cm³ of the 10 N acid required to neutralize the metasilicate.

EXAMPLE 1

In this example the sodium metasilicate measured for dusting contained less than 1% water [dried at 600° C.]. The anhydrous salt was in the form of grains having an average diameter of 0.6 mm. Dusting, expressed in cm³ of the 0, N acid solution required for neutralization, was 7.7.

EXAMPLE 2

The metasilicate of Example 1 was treated with 3% by weight of the dodecahydrate of disodium phosphate, $Na_2HPO_4 \cdot 12H_2O$. The treatment simply consisted of mixing powder with powder in a Lodige laboratory mixer having a 5 liter capacity. Mixing was continued for 2 minutes. Dusting was measured for the composition obtained in this manner, and 0.8 cm³ of the acid solution was required. No irritation was experienced upon olfactory evaluation.

EXAMPLE 3

The same procedure as outlined in Example 2 was followed, on the same metasilicate, but using 3% of sodium borate tetrahydrate [$Na_2BO_3 \cdot 4H_2O$] in place of the phosphate. The amount of dusting for this formulation was determined to be 4.0 cm³ of the acid.

EXAMPLE 4

The same treatment as in Example 2 was performed, but using the decahydrate of borax [$Na_2B_4O_7 \cdot 10H_2O$]. The amount of dusting was determined to be 3.5 cm³ of the 0, N acid solution.

EXAMPLE 5

The amount of dusting evidenced by a sodium metasilicate containing less than 1% water and present in the form of a fine powder (average particle diameter 0.1 mm) was measured. Nineteen cm³ of the 0, N acid solution were required.

EXAMPLE 6

The metasilicate described in Example 5 was treated with 3% of the dodecahydrate of disodium phosphate, $Na_2HPO_4 \cdot 12H_2O$. Mixing was performed in a Lodige laboratory mixer. The amount of dusting, measured after treatment, was 6 cm³ of the 10 N acid.

EXAMPLE 7

The procedure of Example 6 was repeated, but using 5% of the $Na_2HPO_4 \cdot 12H_2O$. The amount of dusting was found to be 0 cm³ of the acid, and no irritation was experienced upon olfactory evaluation.

EXAMPLE 8

A granular metasilicate containing 5% water and having an average particle diameter of approximately 0.5 mm was measured for dusting. The amount of dusting was found to be 2.5 cm³ of the 0, N acid.

EXAMPLE 9

The granular metasilicate of Example 8 was treated in a mixer with 3% of the dodecahydrate of disodium phosphate, $Na_2HPO_4 \cdot 12H_2O$. The amount of dusting of the composition was 0 cm³ of the acid. No respiratory irritation was experienced by olfactory testing.

EXAMPLE 10

A mixture including 40 parts of precipitated, amorphous silica, having a primary particle size average diameter of 200 Å, marketed by the RHONE-POULENC Company under the commercial designation TIXOSIL 38, and 60 parts of water, was prepared in a Lodige mixer. The absorbant capacity of the silica was such that the mixture maintained its powdery form. This admixture was used in the same manner as the hydrates noted in the preceding examples. The metasilicate described in Example 1 was mixed with 3% of this composition, in the Lodige mixer. The amount of dusting of this formulation was determined to be 0.3 cm$^3$ of the 0, N acid.

EXAMPLE 11

For purposes of comparison, to a metasilicate according to Example 1, 10% of a sodium metasilicate having 9 molecules of water of crystallization was added. The mixture was agitated for 10 minutes in the Lodige mixer. The amount of dusting of this particular formulation was determined to be 7.5 cm$^3$ of the 0, N acid; the amount of dusting, therefore, had not declined and remained objectionably high.

EXAMPLE 12

The procedure of Example 11 was repeated, but there was further added 1% of a metasilicate hydrated with 5 molecules of water to serve as crystallization nuclei. The period of mixing remained the same. The results were again negative, the amount of dusting expressed in cm$^3$ of the 10 N acid still was on the order of 7 cc.

It will thus be seen that the foregoing examples strikingly demonstrate the advantages of the present invention; the same easily and rapidly providing a stabilized metasilicate.

While the invention has now been described in terms of certain preferred embodiments, and exemplified with respect thereto, the skilled artisan will readily appreciate that various changes, modifications, substitutions, and omissions may be made without departing from the spirit thereof. Accordingly, it is intended that the present invention be limited solely by the scope of the following claims.

What is claimed is:

1. A composition of matter comprising (i) anhydrous sodium metasilicate, and (ii) a minor amount of an inorganic molecular water donor including either bound water of hydration or free water of sorption which will evolve its water content to the metasilicate (i), at a temperature less than that required for the fusion of sodium metasilicate pentahydrate (72.2° C.), and as will convert from about 1% to about 20% by weight of said anhydrous metasilicate into its said pentahydrate, said water donor (ii) being selected from the group consisting of $Na_2B_4O_7.10H_2O$, $Na_2CO_3.7H_2O$, $Na_2HPO_4.7H_2O$, $Na_2HPO_4.12H_2O$, $(NaPO_3)_3.6H_2O$, $Na_2SO_4.10H_2O$, a caustic compound and silica.

2. The composition of matter as defined by claim 1, wherein the water donor (ii) is present in such amount as will convert from 2% to about 10% by weight of said anhydrous metasilicate into its said pentahydrate.

3. The composition of matter as defined by claim 1, the water donor being selected from the group consisting of $Na_2B_4O_7.10H_2O$, $Na_2CO_3.7H_2O$, $Na_2HPO_4.7H_2O$, $Na_2HPO_4.12H_2O$, $(NaPO_3)_3.6H_2O$ and $Na_2SO_4.10H_2O$.

4. The composition of matter as defined by claim 1, wherein the water donor (ii) is a powder having water sorbed therein in an amount in excess of that required for equilibrium of hydration.

5. The composition of matter as defined by claim 1, wherein the water donor (ii) is a soluble caustic compound.

6. The composition of matter as defined by claim 1, wherein the water donor (ii) is selected from the group consisting of silica, an insoluble derivative of silica, and precipitated silica.

7. The composition of matter as defined by claim 1, the water donor (ii) being present in an amount of from 0.1 to about 5% of the anhydrous metasilicate (i).

8. The composition of matter as defined by claim 1, in finely divided, particulate form.

9. The composition of matter as defined by claim 1, the about 1% to about 20% of sodium metasilicate pentahydrate being converted from anhydrous dust fines.

10. In a detergent formulation including an anti-redeposition agent, the improvement which comprises, as the anti-redeposition agent therefor, the composition of matter as defined by claim 1.

11. The detergent formulation as defined by claim 10, consisting essentially of 20 to 60% of the metasilicate (i), 0.1 to 5% of the water donor (ii), 30 to 70% sodium tripolyphosphate, 10 to 30% of sodium carbonate and 0.1 to 3% of a chlorinating agent.

12. The detergent formulation as defined by claim 10 further comprising a surfactant.

* * * * *